Patented Oct. 13, 1953

2,655,531

UNITED STATES PATENT OFFICE 2,655,531

METHOD OF MAKING NAPHTHALENE-
ACETIC ACID

Philip L. Southwick, Pittsburgh, Pa., assignor to Food Machinery and Chemical Corporation, San Jose, Calif.

No Drawing. Application November 4, 1950,
Serial No. 194,183

9 Claims. (Cl. 260—515)

The present invention relates to a method of preparing 1-naphthaleneacetic acid by the reaction of naphthalene with chloroacetic acid in the presence of potassium bromide as a catalyst.

1-naphthaleneacetic acid has been found to be very acceptable for use as a plant hormone, among other things, and its use for this purpose has increased considerably during recent years. The price of this product is relatively high by reason of the fact that it is prepared by methods which are relatively costly, either by reason of the number of manipulations involved or by reason of poor yields obtainable in single step operations.

Thus, it has been proposed to prepare 1-chloromethylnaphthalene by reacting naphthalene with paraformaldehyde and hydrochloric acid, which product was in turn reacted with sodium cyanide to produce 1-naphthaleneacetonitrile, the desired naphthaleneacetic acid then being formed by hydrolyzing the acetonitrile. Where attempts are made to prepare the acid by direct reaction of naphthalene and chloroacetic acid, yields on the order of 3 to 4% only are obtainable.

It is an object of the present invention to provide essentially a single step procedure for the production of 1-naphthaleneacetic acid.

It is also an object of the invention to prepare 1-naphthaleneacetic acid under conditions which permit a relatively high temperature reaction environment whereby increased yields of the desired end product are obtained.

It is a further object of the invention to provide a catalyst permitting the high temperature reaction between naphthalene and chloroacetic acid whereby increasing yields of the direct end product are obtainable in a single step process.

These and other advantages are obtainable by reacting substantially equimolar quantities of naphthalene and chloroacetic acid in the presence of a small amount of potassium bromide acting as a catalyst for the reaction. The amount of potassium bromide appears to possess some function in the reaction since it has been found, in accordance with the invention, that the yield of 1-naphthalene acetic acid increases to some extent as the amount of the potassium bromide is increased up to about $\frac{1}{10}$ mole of potassium bromide per mole of total reactants. Additions of potassium bromide in excess of this amount do not appear greatly to increase the yield of the desired end product which rises to a maximum of from 25 to 35% yield. The end product, after recrystallization, normally melts in the range 127° C. to 129° C.

While the function of potassium bromide is not completely understood, it is believed that some form of intermediate reaction product is obtained between chloroacetic acid and the potassium bromide which probably aids in attainment of a higher reaction temperature than has been attained heretofore in the single step process, wherein naphthalene was reacted directly with chloroacetic acid. Thus, when chloroacetic acid and potassium bromide are heated together under reflux, the boiling point of the mixture rises to about 250° C. in the course of approximately two hours and distillation of this mixture yields a colorless, rather viscous oily product. This oily product is water-soluble and acidic in reaction and, when mixed with naphthalene and heated, produces 1-naphthaleneacetic acid. The boiling point of the product is sufficiently high, therefore, to permit the attainment, in a reaction mixture, of approximately molar quantities of naphthalene and chloroacetic acid, and about $\frac{1}{10}$ mole potassium bromide, of a temperature of from 210° C. to about 235° C. in open equipment provided with a reflux.

Although the function of the potassium bromide is not known at this time, there are several possible functions of it in the reaction as follows:

(a) That the intermediate is a chloroacetic acid derivative which reacts with naphthalene (by elimination of hydrogen chloride) because it permits a higher reflux temperature in the system than does chloroacetic acid itself.

(b) That it is a substance which is more reactive toward naphthalene than chloroacetic acid or its derivatives and reacts by elimination of some substance other than hydrogen chloride, hydrogen chloride having been evolved in the formation of the intermediate.

(c) That it does not react with naphthalene directly at all, but simply raises the reflux temperature of the system by reason of its relatively low volatility and thereby permits unchanged chloroacetic acid to react directly with naphthalene by elimination of hydrogen chloride.

Although it is desirable to employ materials which are relatively free of moisture, small amounts of water in the reaction mixture will not be found to be deleterious. In general, all of the following experimental results were obtained by heating technical grades of naphthalene and chloroacetic acid in open reflux equipment with the indicated amount of potassium bromide and at temperatures from 210° C. to 235°

C. and subsequently maintaining the reaction mixture at the boiling temperature of the mixture for 24 hours. In general, the chloroacetic acid and potassium bromide were heated together until the chloroacetic acid melted and the temperature of the mixture was maintained above the melting point of chloroacetic acid for about a half hour or so before the naphthalene was added. Generally, yields are slightly better when proceeding in this fashion rather than in heating the three components together. The naphthalene and chloroacetic acid were reacted with a slight excess of the latter.

The desired end product was separated from the reaction mixture by heating the same with approximately 10% aqueous caustic soda, filtering the mixture and acidifying the filtrate to precipitate the crude 1-naphthaleneacetic acid which usually has the form of a dark grey solid. This product was then dried, ground to a fine powder, and extracted with a suitable solvent, in this instance petroleum ether. The final product was obtained by crystallizing it from the solvent from which it was then removed and dried. The product so obtained possessed a melting point in the range 127 to 129° C., whereas the crude product melted in the range from 98° to 129° C.

The results from various experiments are set forth in the table below:

TABLE

*Yields of 1-naphthaleneacetic acid from 0.25 mole of napthalene (32 g.) and 0.31 mole of chloroacetic acid (29.5 g.)*

| Run | Amount of potassium bromide | | Water added, g. | Crude acid | | Melting range, degrees |
|---|---|---|---|---|---|---|
| | Grams | Moles | | Grams | Percent | |
| 1 | 30 | 1.0 | | 8.8 | 19 | 108–113 |
| 2 | 30 | 1.0 | 1 | 6.0 | 13 | 118–121 |
| 3 | 11.9 | .4 | | 9.7 | 21 | 98–129 |
| 4 | 7.5 | .25 | | 8.9 | 19 | 93–128 |
| 5 | 3 | .1 | | (¹) | (¹) | |
| 6 | 3 | .1 | | 7.7 | 16.5 | 88–124 |
| 7 | 3 | .1 | 1 | 11.6 | 25. | 103–124 |
| 8 | 1.5 | .05 | 1 | 2.4 | 5.2 | 120–131 |
| 9 | 1.5 | .05 | | .8 | 1.7 | 117–121 |
| 10 | .5 | .017 | 1 | (¹) | (¹) | |
| 11 | | | 1 | (¹) | (¹) | |

¹ Trace.

What is claimed is:

1. A method of manufacturing 1-naphthaleneacetic acid which comprises heating chloroacetic acid and naphthalene in open equipment under reflux and in the presence of sufficient potassium bromide so that a temperature in the range 210° C. to 235° C. may be reached in the reaction mixture, until 1-naphthaleneacetic acid is formed.

2. A method of manufacturing 1-naphthaleneacetic acid which comprises heating chloroacetic acid and naphthalene in the presence of a minor amount of potassium bromide as a catalyst.

3. A method of manufacturing 1-naphthaleneacetic acid which comprises heating chloroacetic acid and naphthalene in substantially equimolar quantities in the presence of a small amount of potassium bromide at the boiling point of the reaction mixture.

4. A method of manufacturing 1-naphthaleneacetic acid which comprises heating chloroacetic acid and naphthalene in substantially equi-molar quantities in the presence of a small amount of potassium bromide at the boiling point of the reaction mixture under reflux until no further amounts of 1-naphthaleneacetic acid are formed.

5. A method of manufacturing 1-naphthaleneacetic acid which comprises heating chloroacetic acid and naphthalene in substantially equi-molar quantities in the presence of approximately a 1/6 molar quantity of potassium bromide based upon the reactants.

6. A method of manufacturing 1-naphthaleneacetic acid which comprises heating chloroacetic acid and naphthalene in substantially equi-molar quantities in the presence of approximately a 1/6 molar quantity of potassium bromide based upon the reactants at the boiling point of the reaction mixture.

7. A method of manufacturing 1-naphthaleneacetic acid which comprises heating chloroacetic acid and naphthalene in substantially equi-molar quantities in the presence of approximately a 1/6 molar quantity of potassium bromide based upon the reactants in open equipment and under reflux.

8. A method of manufacturing 1-naphthaleneacetic acid which comprises heating chloroacetic acid and naphthalene in substantially equi-molar quantities in the presence of approximately a 1/6 molar quantity of potassium bromide based upon the reactants at the boiling point of the mixture and under reflux for about 24 hours.

9. A method of manufacturing 1-naphthaleneacetic acid which comprises heating chloroacetic acid and a small amount of potassium bromide to form an intermediate reaction product and thereafter adding naphthalene thereto and continuing the heating under reflux until 1-naphthaleneacetic acid is produced.

PHILIP L. SOUTHWICK.

References Cited in the file of this patent

FOREIGN PATENTS

| Number | Country | Date |
|---|---|---|
| 688,964 | France | Sept. 1, 1930 |